(12) United States Patent
Boyle

(10) Patent No.: US 10,606,804 B2
(45) Date of Patent: Mar. 31, 2020

(54) COMPUTERIZED SYSTEMS AND METHODS FOR DISTRIBUTED FILE COLLECTION AND PROCESSING

(71) Applicant: Oath (Americas) Inc., New York, NY (US)

(72) Inventor: Martin Boyle, Dublin (IE)

(73) Assignee: Verizon Media Inc., Dulles, VA (US)

( * ) Notice: Subject to any disclaimer, the term of this patent is extended or adjusted under 35 U.S.C. 154(b) by 628 days.

(21) Appl. No.: 14/607,966

(22) Filed: Jan. 28, 2015

(65) Prior Publication Data

US 2016/0217147 A1 Jul. 28, 2016

(51) Int. Cl.
| | |
|---|---|
| *G06F 17/30* | (2006.01) |
| *G06F 16/13* | (2019.01) |
| *H04L 29/08* | (2006.01) |
| *G06Q 30/02* | (2012.01) |
| *G06F 16/14* | (2019.01) |
| *G06F 16/182* | (2019.01) |
| *G06F 16/955* | (2019.01) |
| *G06F 16/17* | (2019.01) |
| *G06F 16/18* | (2019.01) |

(52) U.S. Cl.
CPC .......... *G06F 16/134* (2019.01); *G06F 16/144* (2019.01); *G06F 16/1734* (2019.01); *G06F 16/182* (2019.01); *G06F 16/183* (2019.01); *G06F 16/1815* (2019.01); *G06F 16/955* (2019.01); *G06Q 30/0277* (2013.01); *H04L 67/06* (2013.01); *H04L 67/22* (2013.01); *H04L 67/34* (2013.01)

(58) Field of Classification Search
CPC ......... G06F 17/30094; G06F 17/30103; G06F 17/30144; G06F 17/30191; G06F 17/30203; G06F 17/30876; G06Q 30/0277; H04L 67/06
See application file for complete search history.

(56) References Cited

U.S. PATENT DOCUMENTS

| | | | | |
|---|---|---|---|---|
| 2002/0082983 | A1* | 6/2002 | Oshiba | G06Q 30/02 705/37 |
| 2008/0064501 | A1* | 3/2008 | Patel | G07F 17/32 463/40 |
| 2009/0043825 | A1* | 2/2009 | Bourne | G06F 17/301 |
| 2010/0223306 | A1* | 9/2010 | Liu | G06F 9/44505 707/822 |
| 2010/0235409 | A1* | 9/2010 | Roy | G06F 17/30094 707/812 |

(Continued)

*Primary Examiner* — Apu M Mofiz
*Assistant Examiner* — Husam Turki Samara
(74) *Attorney, Agent, or Firm* — Bookoff McAndrews, PLLC

(57) ABSTRACT

Systems and methods are disclosed for distributed file collection and processing. According to certain embodiments, a producer system may detect a producer configuration file that specifies a file type, identify at least one file of the specified file type, and send the at least one identified file to a collector system. A conductor system may receive a request from a consumer system and allocate the at least one identified file to the consumer system based on the request. The collector system may receive the at least one identified file from the producer system. The consumer system may send the request to the conductor system and pull the at least one identified file from the collector system.

19 Claims, 6 Drawing Sheets

(56) References Cited

U.S. PATENT DOCUMENTS

| | | | | |
|---|---|---|---|---|
| 2010/0332550 | A1* | 12/2010 | Ainslie | G06F 21/316 |
| | | | | 707/802 |
| 2012/0030018 | A1* | 2/2012 | Passmore | G06F 17/30702 |
| | | | | 705/14.52 |
| 2014/0012890 | A1* | 1/2014 | Miyamae | H04L 67/10 |
| | | | | 709/201 |

* cited by examiner

400B

COMPUTERIZED SYSTEMS AND METHODS FOR DISTRIBUTED FILE COLLECTION AND PROCESSING

BACKGROUND

Technical Field

The present disclosure generally relates to the field of electronic data processing and file collection and management systems. More specifically, and without limitation, the exemplary embodiments described herein relate to computer-implemented systems and methods for distributed file collection and processing in, for example, high latency, distributed networks.

Background

Online content systems and related services are used for handling the distribution and placement of electronic content on the Internet. Such content may include articles, videos, and other content, including online advertisements. In the field of online advertising, for example, computerized systems and services are provided for managing and placing advertisements for goods and services on web pages viewed by users throughout the world. Online advertising systems collect information about advertisements from ad creators and profile information from users and process this information in order to determine how to deliver ads to users who are likely to be interested in particular goods or services. Similar techniques are also used for other forms of electronic content placed on web pages.

Several different parties may be involved in an online content system. For example, with reference again to the online advertising field, such parties may include advertisers, publishers, users (i.e., consumers of goods and services), and online advertising service providers. Multiple parties and systems are also involved when dealing with the distribution of other online content for the Internet. In most cases, the relevant parties are scattered geographically throughout the world. As a result, the systems and hardware components involved in collecting and processing pertinent data may likewise be scattered across multiple regions or continents. For example, an online advertising system may comprise ad servers, bid servers, processing and/or collection centers, and consumer systems spread across multiple regions or continents. As the number of entities and users involved in these systems and the amount of data exchanged by these parties grows, the disparate locations of these computerized components can create data latencies that hinder the ability to serve the creators and recipients of relevant data.

Current online content systems also suffer from downtime due to static system configuration and other factors. For example, the types of data to be collected from an ad server or a bid server may be configured in a static file, such that the addition of any new file types requires elements of the system to be shut down. User data may also be configured in a static file, such that the addition of new recipients of pertinent data may require that certain system elements be shut down. As online advertising systems and other content systems grow to accommodate additional content creators and recipients, and change to handle new types of data, the downtime caused due to static configuration may lead to unacceptably frequent service interruptions.

As a result, there is a need for improved systems and methods for distributed file collection and processing that can adapt and elastically expand and contract with minimal configuration and downtime. There is also a need for systems and methods to automatically discover, register, and/or remove data and react to changes in data types provided by data producers. Moreover, there is a need for systems and methods that can dynamically react to the addition of new consumers or changing needs of existing data consumers.

SUMMARY

Consistent with the present disclosure, computer-implemented systems and methods are provided for distributed file collection and processing. Embodiments consistent with the present disclosure include computer-implemented systems and methods for managing the collection of files from one or more producers and the distribution of those files to one or more consumers. Embodiments consistent with the present disclosure may provide one or more advantages, as set forth herein.

In accordance with an exemplary embodiment, a computerized system is provided for distributed file collection and processing. The system may comprise a producer system, a collector system, a conductor system, and a consumer system. The producer system comprises a first memory that stores a first set of instructions and a first processor in communication with the first memory and configured to execute the first set of instructions to detect a producer configuration file that specifies a file type, identify at least one file of the specified file type, and send the at least one identified file to the collector system. The conductor system comprises a second memory that stores a second set of instructions and a second processor in communication with the second memory and configured to execute the second set of instructions to receive a request from the consumer system and allocate the at least one identified file to the consumer system based on the request. The collector system comprises a third memory that stores a third set of instructions and a third processor in communication with the third memory and configured to execute the third set of instructions to receive the at least one identified file from the producer system. The consumer system comprises a fourth memory that stores a fourth set of instructions and a fourth processor in communication with the fourth memory and configured to execute the fourth set of instructions to send the request to the conductor system and pull the at least one identified file from the collector system.

In accordance with another exemplary embodiment, a computerized method is provided for distributed file collection and processing. The method may include using a producer system with at least one processor to detect a producer configuration file that specifies a file type, identify at least one file of the specified file type, and send the at least one identified file to the collector system. The method may also include using a conductor system with at least one processor to receive a request from a consumer system and allocate the at least one identified file to the consumer system, based on the request. Further, the method may include using a collector system with at least one processor to receive the at least one identified file from the producer system. Moreover, the method may include using a consumer system with at least one processor to send the request to the conductor system and pull the at least one identified file from the collector system.

In accordance with still further embodiments, computer readable media is provided with instructions for configuring one or more processors to perform the operations of detecting a producer configuration file that specifies a file type, identifying at least one file of the specified file type, and sending the at least one identified file to a collector system. The operations may also include allocating the at least one identified file to a consumer system based on a request from the consumer system. Further, the operations may include pulling the at least one identified file from the collector system to the consumer system.

Before explaining certain embodiments of the present disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception and features upon which this disclosure is based may readily be utilized as a basis for designing other structures, methods, and systems for carrying out the several purposes of the present disclosure. Furthermore, the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION OF EXEMPLARY EMBODIMENTS

Reference will now be made in detail to the exemplary embodiments implemented according to the disclosure, the examples of which are illustrated in the accompanying drawings. Wherever possible, the same reference numbers will be used throughout the drawings to refer to the same or like parts.

Embodiments herein include computer-implemented methods, tangible non-transitory computer-readable mediums, and systems. The computer-implemented methods may be executed, for example, by at least one processor that is configured by instructions from a non-transitory computer-readable storage medium. Similarly, systems consistent with the present disclosure may include at least one processor and memory, and the memory may be a non-transitory computer-readable storage medium. As used herein, a non-transitory computer-readable storage medium refers to any type of physical memory or storage device on which information or data readable by at least one processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Figure 1:
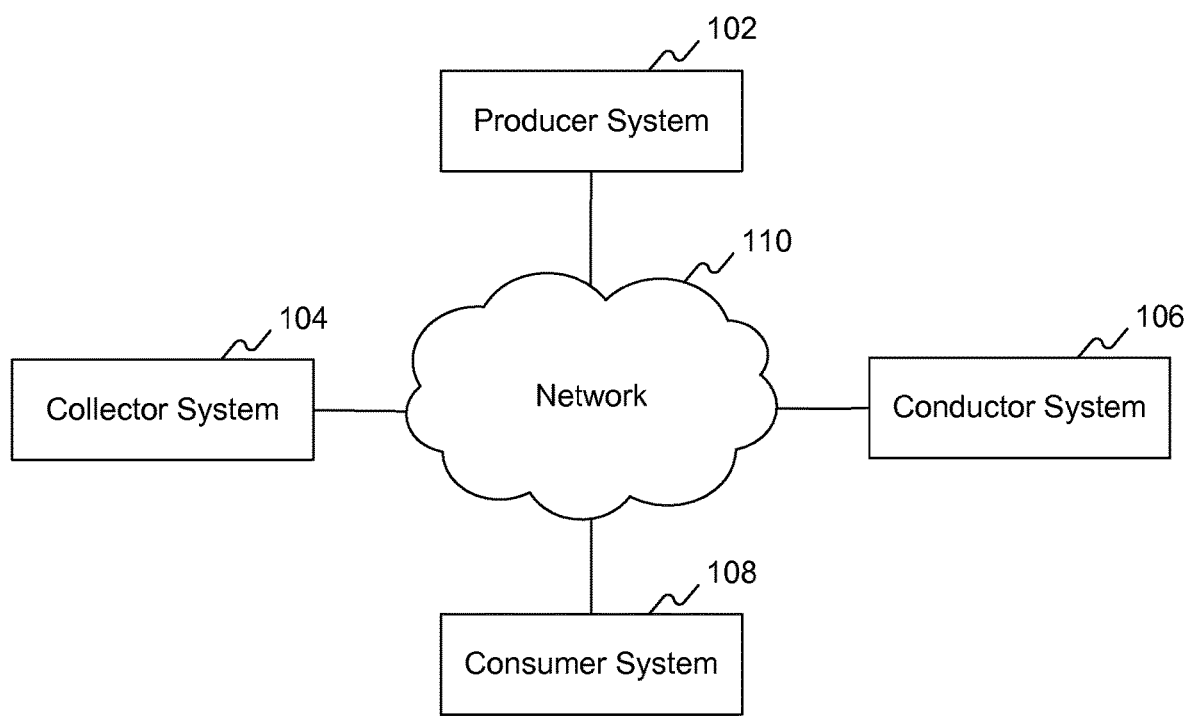
FIG. 1 illustrates an exemplary system environment for implementing embodiments consistent with the present disclosure.

FIG. 1 illustrates an exemplary system environment 100 for implementing embodiments consistent with the present disclosure. The number and arrangement of components in FIG. 1 are merely exemplary. System environment 100 may be implemented with similar or different arrangements, and the number of components (102, 104, 106, 108, and 110) may be increased or otherwise modified so as to provide, for example, multiple components of each type shown in FIG. 1. Moreover, as will be appreciated from this disclosure, these components may be combined or substituted, as needed, to meet system needs or objectives.

The various components of system environment 100 may include an assembly of hardware, software, and/or firmware, including a memory, a central processing unit ("CPU"), and/or a user interface. An exemplary embodiment of an electronic apparatus 500 is show in FIG. 5 that may be used to implement the system components (102, 104, 106, and 108) of environment 100. Memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. A CPU may include one or more processors for processing data according to a set of programmable instructions or software stored in the memory. The functions of each processor may be provided by a single dedicated processor or by a plurality of processors. Moreover, processors may include, without limitation, digital signal processor (DSP) hardware, or any other hardware capable of executing software. An optional user interface may include any type or combination of input/output devices, such as a display monitor, keyboard, and/or mouse.

As shown in FIG. 1, system environment 100 may include one or more producer systems 102. Producer system 102 may be configured to generate and/or receive data related to online content. Producer system 102 may include one or more server systems, databases, and/or computing systems. Data may be transmitted from or received by producer system 102 using network 110. In some embodiments, data is communicated individually or in packets. Additionally, data may be communicated via files. In some embodiments, data is communicated with other systems (104, 106, and 108) over network 110. As further described herein, producer system 102 may process and/or store data, as well as transmit the data to other systems (104, 106, and 108) to facilitate the distribution and placement of electronic content on the Internet. In some embodiments, producer system 102 stores online content and/or data related to online content.

As further shown in FIG. 1, network 110 may be provided to connect and communicate data by and between one or more producer systems 102, one or more collector systems 104, one or more conductor systems 106, and one or more consumer systems 108. Network 110 may include one or more types of networks, including wired and wireless networks. For example, network 110 may include one or more wide area networks (WANs), metropolitan area networks (MANs), local area networks (LANs), or any combination of these networks. Further, network 110 may include a combination of a variety of different network types, including Internet, Ethernet, twisted-pair, coaxial cable, fiber optic, public switched telephone network (PSTN), cellular, satellite, IEEE 802.11, terrestrial, and/or other types of network connections. In some embodiments, network 110 comprises the Internet.

System environment 100 may also include one or more collector systems 104. Collector system 104 may include one or more server systems, databases, and/or computing systems configured to receive data from entities over network 110, process and/or store the data, and transmit the data to other entities over network 100. In some embodiments, collector system 104 may store logs and other files generated by, for example, one or more producer systems 102. In one embodiment, collector system 104 comprises a FTP server. In another embodiment, collector system 104 comprises a HTTP server. In still another embodiment, collector system 104 is a UDT server. As will be appreciate from this disclosure, collector system 104 may also support or provide one or more of a FTP server, a HTTP server, and a UDT server. As will be appreciated from this disclosure, other protocols and servers are possible.

System environment 100 may also include one or more conductor systems 106. Conductor system 106 may include one or more server systems, databases, and/or computing systems configured to receive data from entities over a network 110, process and/or store the data, and transmit the data to other entities over network 110. Conductor system 106 may track files within system environment 100, including if, when, and where each file is processed. The conductor service 106 may also serve as a registry for consumer systems 108 and a repository for the configuration of producer systems 102 and/or collector systems 104.

As further shown in FIG. 1, system environment 100 may include one or more consumer systems 108. Consumer system 108 may include one or more server systems, databases, and/or computing systems configured to receive data from entities over network 110, process and/or store the data, and transmit the data to other entities over network 110. Consumer system 108 may be associated with consumers or users of online content, such as consumers of online advertisements. For example, consumer system 108 may be associated with businesses and/or other entities who utilize an online advertising service for ad placement. In some embodiments, a single consumer system 108 (or host) may include data for multiple consumers. Further, consumer system 108 may include one or more applications for each consumer associated with consumer system 108. Various operations may be handled by consumer system 108, including registration of consumers with consumer system 108, polling of conductor system 106 for files to be processed by consumer system 108, and/or the retrieval of files from collector system 104 for placement on consumer system 108. In addition, consumer system 108 may track when files have been processed by each consumer registered with consumer system 108 and notify conductor system 106 of this processing. Further, consumer system 108 can provide configuration files that indicate the type of files to be processed (e.g., impression logs, click logs, and the like).

Figure 3:
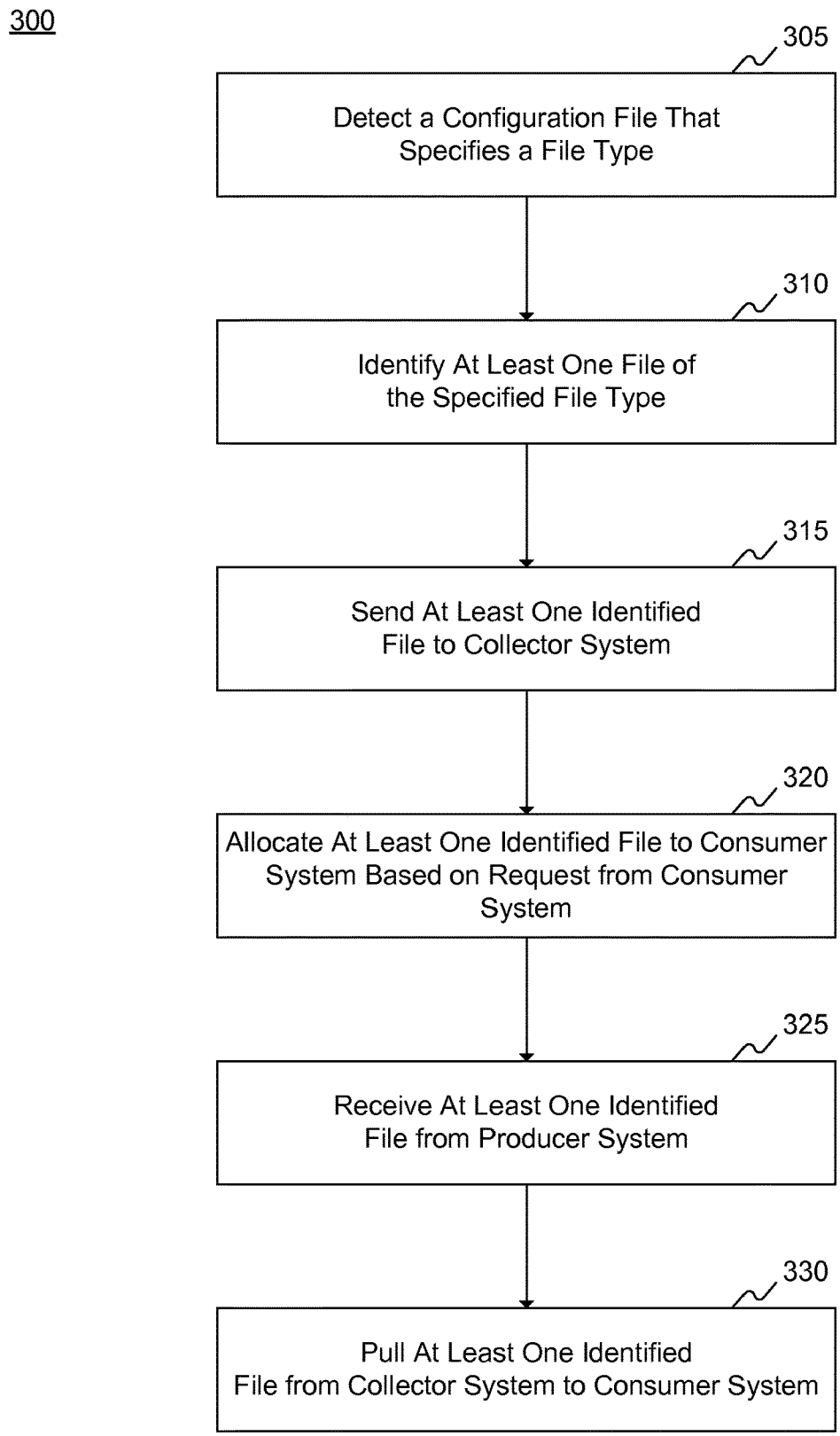
FIG. 3 is a flow diagram depicting an exemplary process for distributed file collection and processing, in accordance with an embodiment of the present disclosure.

System environment 100 of FIG. 1 may be used for implemented the processes and features of the present disclosure. In addition, system environment 100 may be implemented for various types of online content systems and services. By way of example, the process of FIG. 3 may be implemented using system environment 100 and the components thereof. The exemplary process of FIG. 3 is further described below.

Figure 2:
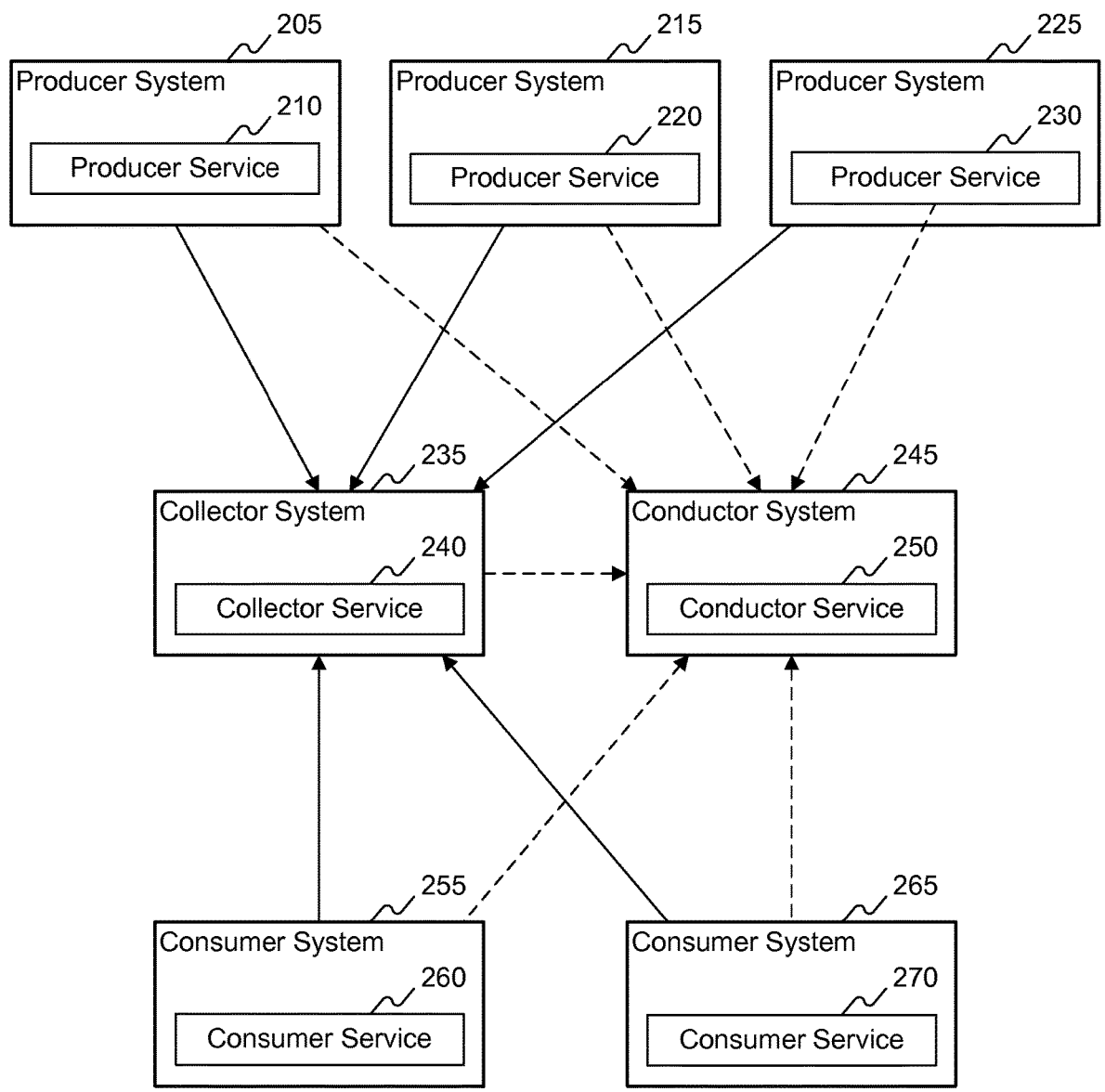
FIG. 2 illustrates an exemplary system for distributed file collection and processing, in accordance with an embodiment of the present disclosure.

FIG. 2 illustrates an exemplary system 200 for distributed file collection and processing, in accordance with an embodiment of the present disclosure. System 200 is described below with reference to an implementation for online advertising. It will be appreciated, however, that system 200 may be adapted for use with other online content services and environments.

As shown in FIG. 2, system 200 includes a number of components. It will be appreciated from this disclosure that the number and arrangement of these components is exemplary and provided for purposes of illustration. In addition, the components may be combined and/or substituted. Other arrangements and numbers of components may be utilized without departing from the teachings and embodiments of the present disclosure. Further, it is noted that for purposes of illustration, a network (such as network 110 in FIG. 1) is not illustrated in FIG. 2. It shall be understood, however, that communication between the component in FIG. 2 and the distribution of files may be supported by one or more networks (such as network 110 in FIG. 1).

Figure 5:
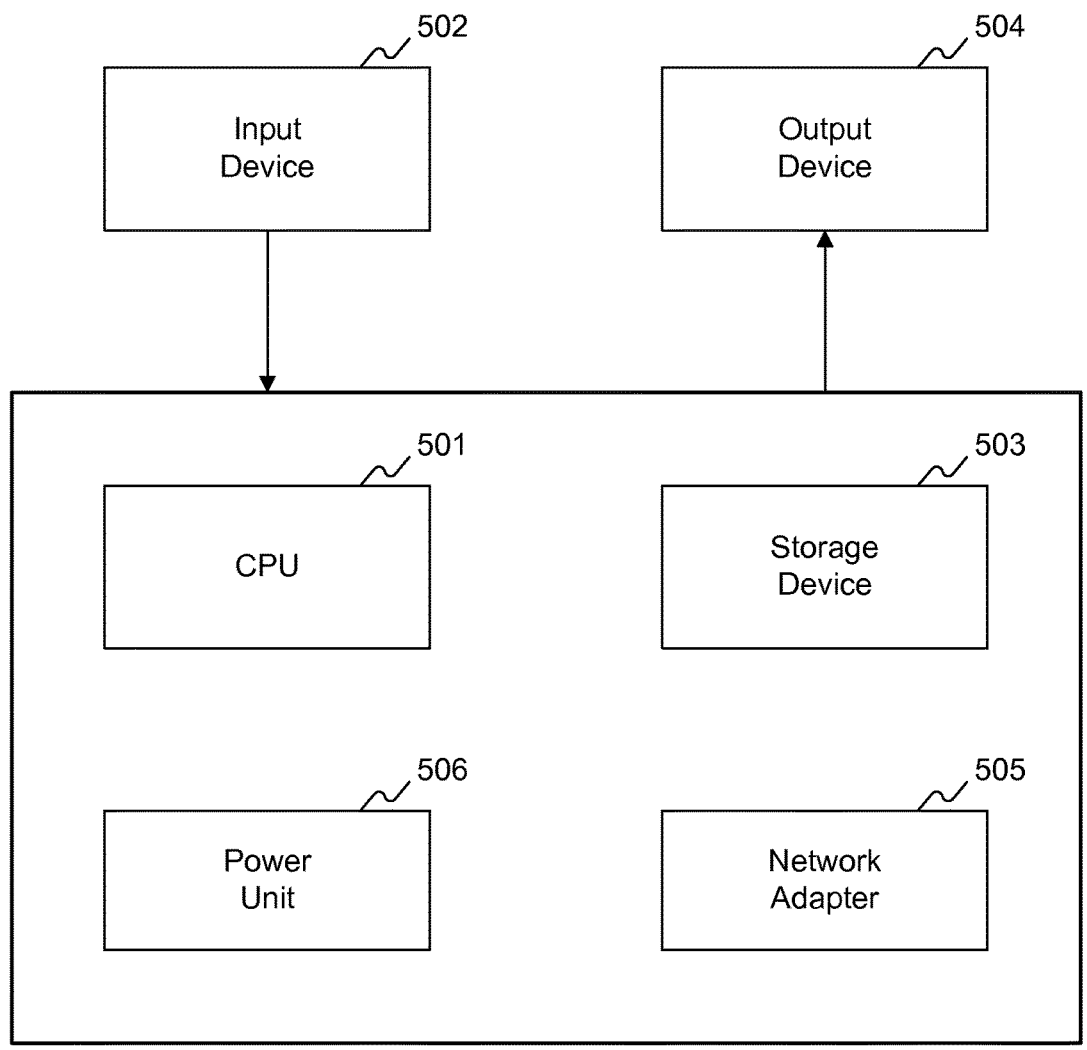
FIG. 5 illustrates an example electronic apparatus for implementing some embodiments and aspects of the present disclosure.

Each of the components of system 200 (e.g., producer systems 205, 215, 225; collector system 235; conductor system 245; consumer systems 255, 265) may include an assembly of hardware, software, and/or firmware, including a memory, a CPU, and/or a user interface. Memory may include any type of RAM or ROM embodied in a physical storage medium, such as magnetic storage including floppy disk, hard disk, or magnetic tape; semiconductor storage such as SSD or flash memory; optical disc storage; or magneto-optical disc storage. A CPU may include one or more processors for processing data according to a set of programmable instructions or software stored in the memory. The functions of each processor may be provided by a single dedicated processor or by a plurality of processors. Moreover, processors may include, without limitation, DSP hardware, or any other hardware capable of executing software. An optional user interface may include any type or combination of input/output devices, such as a display monitor, keyboard, and/or mouse. An exemplary embodiment of an electronic apparatus 500 is shown in FIG. 5 that may be used to implement the components of system 200.

As shown in FIG. 2, the exemplary system 200 includes producer systems 205, 215, and 225. Producer systems 205, 215, and 225 (like producer system 102 in FIG. 1) may include one or more server systems, databases, and/or computing systems configured to receive data from entities over a network, process and/or store the data, and transmit the data to other entities over the network. In some embodiments, data is communicated individually or in packets. Additionally, data may be communicated via files.

In some embodiments, each of producer systems 205, 215, and 225 may be an ad server or bid server associated with an online advertising system or service. An ad server may store data relating to advertisements. In one embodiment, an ad server stores advertising content (i.e., ads) produced by one or more advertisers for placement on a web page. In addition to ads, ad server may store data pertaining to each ad. For example, an ad server may store metadata for each ad, such as the ad creator, dimensions, filename, file size, and a hyperlink (i.e., a web address associated with the ad). An ad server may store other information as well, such as intended audience, geolocation data (e.g., a location associated with the ad creator), and campaign dates (e.g., a date range during which the ad should be displayed to users) for each ad.

As an ad server, producer systems 205, 215, and 225 may store one or more logs, such as impression logs, click logs, and action logs. An impression log may provide information on advertising impressions. An impression (or view) corresponds to one instance of a display of an advertisement to a user on a web page. An impression log may include a variety of information describing impressions, including media identifier (e.g., an identifier of the ad banner or image displayed), cookie identifier, timestamp (e.g., time ad was displayed), web page (e.g., URL of web page on which impression occurred), internet protocol (IP) address of user, geographic data for user, and profile data for user.

As an ad server, producer systems 205, 215, and 225 may also store one or more click logs and action logs. A click log may include information pertaining to instances in which a user clicks or selects an advertisement. An action log may include information pertaining to actions taken by a user following selection of an advertisement, such as the amount of time the user spent on a web page associated with the advertiser and whether the user purchased any goods or services from the advertiser after clicking on the advertisement.

As a bid server, producer systems 205, 215, and 225 may include information regarding bids associated with advertising impressions. According to certain online advertising environments, advertisers compete for impressions by submitting bids in a process referred to as real-time bidding. In real-time bidding, advertisers bid on an impression, and the winning advertiser's ad is displayed on a web site to a user. Accordingly, in the role of a bid server, producer systems 205, 215, and 225 may store information pertaining to the bids submitted to an online advertising service for ad impressions, including a web page, user demographic information, user geographic information, user browsing history, bid amount, bidder identifiers, and winning bidder. In one embodiment, this information may be stored in a bid log.

In one embodiment, producer systems 205, 215, and 225 store logs corresponding to their system type. For example, an ad server may store one or more impression logs, click logs, and action logs. A bid server may store one or more bid logs. Producer systems 205, 215, and 225 may send data regarding these logs over an electronic network to collector system 235 or conductor service 250. For example, producer systems 205, 215, and 225 may send messages containing information pertaining to the logs to conductor service 250 and send log content (e.g., files) to collector system 235.

According to certain embodiments, each of producer systems 205, 215, and 225 includes a producer service, such as producer services 210, 220, and 230. The producer service may be implemented with a set of instructions or application executed by one or more processors of the producer system. The producer service may act as a registry for file types to be transferred from the host producer system and coordinate transfer of files to collector system 235. Moreover, the producer service may monitor the host producer system for new logs or other files and send notifications to conductor service 250 regarding logs or files that are available for transfer. The producer service may also obtain configuration data from conductor service 250 and poll conductor service 250 for files to be resent to collector system 235 and for files that may be deleted from the host producer system. In one embodiment, an application running on the host producer system may provide configuration data to the producer service.

The producer service may push logs or other files to collector system 235 via file transfer protocol (FTP), hypertext transfer protocol (HTTP), user datagram protocol (UDP)-based data transfer (UDT), and/or any other protocol for transferring data over an electronic network. The protocol used by producer service for pushing logs or other files to collector system 235 may depend on network conditions and traffic.

As shown in FIG. 2, system 200 also includes a collector system 235. Collector system 235 (like collector system 104 in FIG. 1) may include one or more server systems, databases, and/or computing systems configured to receive data from entities over a network, process and/or store the data, and transmit the data to other entities over the network. Collector system 235 may store logs and other files generated by producer systems 205, 215, and 225. In one embodiment, collector system 235 is a FTP server. In another embodiment, collector system 235 is a HTTP server. In still another embodiment, collector system 235 is a UDT server.

In one embodiment, collector system 235 includes a collector service 240. Collector service 240 may be implemented with a set of instructions or application executed by one or more processors of collector system 235. Collector service 240 may handle data transfer requests, including requests for transfer of data using FTP, HTTP, and/or UDT. For example, collector service 240 may receive and process data transfer requests from producer systems 205, 215, and 225 and consumer systems 255 and 265. Collector service 240 may also track files that have been uploaded to collector system 235 and notify conductor service 250 that the uploaded files are ready for processing. Moreover, collector service 240 may poll conductor service 250 for files that can be deleted from collector system 235.

System 200 also includes one or more consumer systems, such as consumer systems 255 and 265. Consumer systems 255 and 265 (like consumer system 108 in FIG. 1) may include one or more server systems, databases, and/or computing systems configured to receive data from entities over a network, process and/or store the data, and transmit the data to other entities over the network. In one embodiment, consumer systems 255 and 265 may be associated with consumers of online content, such as online advertisements. These consumers may include businesses and/or other entities who utilize, for example, an online advertising environment or service for ad placement. In one embodiment, one consumer system (or host) may include data for multiple consumers. Further, a consumer system may include one or more applications for each consumer associated with the consumer system.

Consumer systems 255 and 265 may include consumer services, such as consumer services 260 and 270. A consumer service may be implemented with a set of instructions or application executed by one or more processors of a consumer system. A consumer service may register consumers with a host consumer system. Consumer service 260 and 270 may also poll conductor service 250 for files to be processed by the host consumer system. Further, consumer service 260 and 270 may fetch files from collector system 235 and place a copy of each fetched file on the host consumer system. In one embodiment, a copy of the entire file is stored on the host system. In another embodiment, a link to the file is stored by the consumer service. Consumer service 260 and 270 also tracks when files have been processed by each consumer associated with the host consumer system and notifies conductor service 150 of this processing. In one embodiment, applications running on the host consumer system can provide configuration files to consumer service 260 and 270 to indicate the type of files that they want to process (e.g., impression logs, click logs).

As further illustrated in FIG. 2, system 200 also includes a conductor system 245. Conductor system 245 (like conductor system 106 in FIG. 1) may include one or more server systems, databases, and/or computing systems configured to receive data from entities over a network, process and/or store the data, and transmit the data to other entities over the network. Conductor system 245 may include a conductor service 250 for tracking files within system 200, including if, when, and where each file is processed. Conductor service 250 may also serve as a registry for consumer services 260 and 270 and a repository for the configuration of producer services 210, 220, and 230 and collector service 240. Conductor service 250 may be implemented with a set of instructions or application executed by one or more processors of conductor system 245.

Exemplary flows of information among the components of system 200 are depicted in FIG. 2. Instances of log or other file transfers among the components are indicated in solid lines. Control message flow is indicated using broken lines. As shown in FIG. 2, producer systems 205, 215, and 225 send logs and/or other files to collector system 235, and collector system 235 provides those files to consumer systems 255 and 265. Moreover, producer services 210, 220, and 230, collector service 240, and consumer services 260 and 270 send control messages to conductor service 250.

It will be appreciated that any suitable configuration of software, processors, and data storage devices may be selected to implement the components of system 200 and features of related embodiments. The software and hardware associated with system 200 may be selected to enable quick response to various business needs, relatively fast prototyping, and delivery of high-quality solutions and results. An emphasis may be placed on achieving high performance through scaling on a distributed architecture. The selected software and hardware may be flexible, to allow for quick reconfiguration, repurposing, and prototyping for research purposes. The data flows and processes described herein are merely exemplary, and may be reconfigured, merged, compartmentalized, and combined as desired. The exemplary modular architecture described herein may be desirable for performing data intensive analysis. A modular architecture may also be desired to enable efficient integration with external platforms, such as content analysis systems, various plug-ins and services, etc. Finally, the exemplary hardware and modular architecture may be provided with various system monitoring, reporting, and troubleshooting tools.

In accordance with embodiments of the present disclosure, the components of system 200, such as producer systems 205, 215, and 225, collector system 235, conductor system 245, and consumer systems 255 and 265, may perform various methods for distributed file collection and processing. Among other advantages, the disclosed embodiments may provide for automatic discovery and registration of producer and consumer data. Accordingly, new producer systems and data (e.g., new types of log files) and new consumer systems and data (e.g., new consumer application requirements) may be added to system 200, without requiring that components of system 200 be shut down. Therefore, system downtime is reduced and online content (such as online advertisements) are served to end users more efficiently.

FIG. 3 depicts a flow diagram of an exemplary process 300 for distributed file collection and processing, in accordance with an embodiment of the present disclosure. By way of example, process 300 will be described with reference to the components of FIG. 1. While the steps associated with process 300 are described below with reference to producer system 102, collector system 104, conductor system 106, and consumer system 108 of FIG. 1, it will be appreciated that process 300 may be implemented in other systems and arrangements, including system 200 of FIG. 2, for example. The number and arrangement of steps in process 300 may be changed, modified, combined, and/or substituted, consistent with the present disclosure.

In step 305, a configuration file that specifies a file type is detected by producer system 102. In one embodiment, the configuration file is a producer application configuration file received from a producer application. Moreover, in some embodiments, the file type is a log, such as an impression log, click log, action log, or bid log. After the configuration file is detected in step 305, product system 102 identifies at least one file of the specified file type in step 310. For example, the at least one file may be identified by scanning a memory or storage device for files of the specified file type. In step 315, producer system 102 sends the at least one identified file to collector system 104. For example, the at least one identified file may be sent using FTP or UDT and transmitted over network 110 to collector system 104.

In step 320, the at least one identified file is allocated by conductor system 106 to a consumer system based on a request from the consumer system (e.g., consumer system 108). In one embodiment, the request from consumer system 108 identifies a requested file type. Moreover, conductor system 106 may determine whether producer system 102 has any files of the requested file type. This may be performed by accessing an index or other storage of conductor system 106 that contains an identification of files stored on producer system 102. In one embodiment, conductor system 106 receives this information from producer system 102 in file notifications. Alternatively, conductor system 106 may request an identification of available files from producer system 102. If it exists, at step 325, the at least one identified file is received by collector system 104 from producer system 102. Thereafter, consumer system 108 pulls the at least one identified file from collector system 104 at step 330. In one embodiment, consumer system 108 processes the at least one identified file. Moreover, the processing of the at least one file may be monitored, such that conductor system 106 may be notified when the processing of the at least one file is complete.

Other features and operations may be implemented in system environment 100 of FIG. 1, as well as system 200 of FIG. 2. For example, in some embodiments, a producer service is installed on a producer system (e.g., producer system 102 of FIG. 1; producer systems 205, 215, 225 of FIG. 2) that automatically starts when that producer system starts or restarts. In addition to the producer service, each producer system may include one or more producer applications. Each producer application may provider separate file type configurations to the producer service.

At startup, the producer service may scan an input directory to discovery file types that will be processed by the producer service. The producer service may send a message to a current registered conductor service of conductor system (e.g., conductor system 106 of FIG. 1; conductor system 245 of FIG. 2) that includes the code version, configuration version, and file types for the producer service. The conductor service may determine whether an updated configuration exists for the producer service, and, if so, provide the updated configuration to the producer service. This configuration may include information regarding conductor endpoints, including any changes to conductor end points for registration and messaging to the conductor service. The conductor service may also tell the producer service not to send certain file types to collector system(s) (e.g., collector system 104 of FIG. 1; collector system 235 of FIG. 2). If the producer service is unable to register with the conductor service for a set period of time, the producer service generates an alert. After the producer service is started and receives any necessary configuration from the conductor service, the producer service may scan the directories of the producer system for files to send to collector system(s).

In one embodiment, the producer service maintains an index of files that have been generated by the host producer system. If the producer service is stopped and restarted, the producer service may access the index to identify files that have been generated by applications on the host producer system since the point that the producer service was stopped. The producer service may then resume processing these files. If the index of processed files is corrupt and cannot be read by the producer service, then the producer service may sync with the conductor service to get an index of files. For example, the producer service may periodically send the index of processed files to the conductor service. When the producer service cannot read the index, it may send a request to the conductor service to get the most recent copy of the index stored at the conductor system. The conductor service may send the most recent copy of the index to the producer service. The producer service may then use this copy of the index to resume processing of files on the host producer system.

If a new or modified application is installed on the host producer system, or a new file type becomes available on the host producer system, the producer service may automatically detect this configuration change and send a message to the conductor service including information regarding the change. The conductor service may analyze the message to determine whether any configuration changes are necessary for the producer service based on the modifications. The conductor service may also analyze whether any new files or file types may be collected by a collector system (e.g., collector system 104 of FIG. 1; collector system 235 of FIG. 2). The conductor service may send a response to the producer service that includes this information, so that the producer service may modify its configuration, if necessary, and proceed with processing the files, as appropriate.

In one embodiment, the producer service is configured to scan and automatically detect changes to directories on the host producer system based on the file type configuration stored by the producer service. For any new file detected, the producer service may send a persistent notification to the conductor service that the producer service located the file and send the new file to a collector system. After the file is successfully transferred, the producer system (e.g., producer system 102 of FIG. 1; producer systems 205, 215, 225 of FIG. 2) may move or delete the file according to the strategy specified in the file type configuration. If the producer is unable to send the file to the collector system after a specified number of attempts, the producer service sends an error notification to the conductor service and continues to attempt to deliver the file to the collector system.

The producer service may also receive configuration changes from the conductor service (e.g., conductor system 106 of FIG. 1; conductor system 245 of FIG. 2). In response, the producer service may check to determine whether the received configuration matches the current software and/or configuration version for the producer service. If so, the producer service may respond to the conductor service with a message indicating that the producer service will update its configuration. The producer service may then restart and register with the conductor service.

In one embodiment, a producer service may be configured to send data in UDP. If the producer service cannot send data in UDP (e.g., due to high packet loss or a blocked port), the producer service will attempt to send data using FTP.

A producer service may send a notification to the conductor service that the host producer system is being removed from an online content system (e.g., system 100 or 200). In one embodiment, the conductor service continues to operate as though the producer system is valid until it is explicitly removed from a conductor database. In another embodiment, the conductor service treats the producer system as invalid upon receipt of the notification.

In one embodiment, the collector service sends a notification to the conductor service when the host collector system starts up. The conductor service may check to determine whether any configuration changes are appropriate for the collector service and send those changes to the collector service in response to the notification. If the collector service is not behind a load balancer, then the startup notification may also be broadcast to the producer services. Moreover, if the collector service is behind a load balancer, the collector service may send a notification regarding service shut down to one or more producer services.

The collector service may detect received files by scanning one or more directories on the host collector system (e.g., collector system 104 of FIG. 1; collector system 235 of FIG. 2). The collector service may send information regarding any new files to the conductor service, such as filename and host collector system. If the collector service is restarted the host collector system may continue to run independently of the collector service. After the collector service starts up, the collector service scans for new files based on an index of processed files. If this index is corrupt, the collector service sends information regarding all available file references to the conductor service. The conductor service may detect duplicate file references and send information regarding the duplicate file references to the collector service.

If a collector system is being decommissioned, then the collector system endpoint may be removed from the appropriate producer service configuration files and files on the collector system may be cleared out through normal processing. The collector service may determine whether files on the host collector system need to be moved to another collector system. If so, the files may be copied into the new collector system input directory. The conductor service may detect that the new file is a duplicate that has been moved from one collector system to another. The file may be processed from the new collector system if a consumer service sends a notification to the conductor service that the file cannot be found at the original collector system.

The collector service may communicate with the conductor service to determine whether a file stored on the host collector system may be deleted. In one embodiment, the collector service may send a request to the conductor service for an inventory of files that may be deleted based on a file timestamp. The conductor service may respond with an identification of files to be deleted, and the collector service may delete the identified files from the host collector system. The conductor service may also send configuration changes to the collector service. In response, the collector service may check that the configuration change matches the software and current configuration version of the collector service. If so, the collector service may respond to the conductor service that it will update its configuration. The collector service may then restart and register with the conductor service. If the collector service has not received new traffic for a specified period of time, the collector service may send an alert notification to the conductor service.

In one embodiment, a consumer service may check for any registered consumer types in its configuration directory upon startup. After identifying any registered consumer types, the consumer service may connect to the conductor service and send the conductor service information regarding the consumer version, configuration version, and file types associated with the consumer service. The conductor service may register the consumer service based on this information and send a notification to the consumer service that the consumer service has been registered. After the conductor service has registered the consumer service, the consumer service may being processing.

In one embodiment, the consumer service monitors a configuration directory on the host consumer system to detect if a new consumer application or file has been added. If a new application or file is added, the consumer service sends information to the conductor service regarding the new configuration. The consumer service may also monitor the configuration directory to detect if a consumer application or file has been removed. If so, the consumer service sends information to the conductor service about the new configuration. The conductor service may continue to handle processing of files based on information previously received from the consumer service, but no longer download additional information from the consumer service.

In one embodiment, a configuration file on the consumer system defines the maximum number of files on the system to queue for a given process. This configuration file may also determine the desired minimum number of files to fetch. The consumer service may use this configuration information to query the conductor service for information regarding files to process. After the consumer service receives a response from the conductor service with information regarding files to process, such as file type and host collector system, the consumer service fetches the file from the collector system and stores the file on the consumer system as specified in the configuration file for the consumer system. The consumer service may then notify the conductor service that the file has been received at the consumer system. The consumer service may also monitor the processing of files on the consumer system and send a notification to the conductor service once processing is completed.

In one embodiment, a conductor service may receive a configuration request from one or more producer services, collector services, and consumer services. The configuration request may include a host version and configuration version. The conductor service may save this information in a database. In one embodiment, the conductor service may compare the received configuration information against information stored in the database to determine whether the producer service, collector service, or consumer service should update its configuration. Further, in response to a configuration request from a producer service, the conductor service may send information to the producer service regarding any file types that the producer service should not send to the collector system. In response to a configuration request from a collector service, the conductor service may inform the collector service regarding whether the collector service is currently enabled, such that the collector service may determine whether to send messages to other system components regarding files that are available on the collector system. In response to a configuration request from a consumer service, the conductor service may inform the consumer service whether it is currently enabled and create a queue for files to be processed by each consumer type.

The conductor service may also receive file notifications from producer services and collector services. In response to a file notification from a producer service, the conductor service records the notification for future auditing. In response to a file notification from a collector service, the conductor service may record the notification for future auditing and push the file reference to a queue for each consumer type.

The conductor service may receive a request from a consumer service for a file to process. In response, the conductor service may allocate the work to each consumer of the file. The conductor service may also receive a notification from a consumer service that file processing is complete and record the notification for future auditing. In one embodiment, the conductor service may pause processing of a specified file type. If the conductor service pauses processing of a file type, file notifications for that file type are still received by the conductor service and allocated to one or more queues, but the requested files are not provided to consumers. Once the conductor service resumes processing of the specified file type, file notifications on internal queues may be provided to the relevant consumers.

The conductor service may also update the configuration of producer services, collector services, and consumer services. For example, the conductor service may check the lists of producer services, collector services, and consumer services and push any necessarily configuration changes to each service. Moreover, the conductor service may track when configuration changes are made by the services.

The conductor service may reschedule files for reprocessing when it determines that files have not been processed appropriately. In one embodiment, files that have not been processed may be pushed to a different consumer service. Moreover, the conductor service may check a list of notifications received from the producer and collector services to ensure that all files have been delivered to the appropriate collector systems. The conductor service may also check that producer services have generated files, regardless of whether those files have been delivered to the collector services. Further, the conductor service may receive a request from a collector service to delete a file. In response, the conductor service checks to see if the file is currently being processed and whether a file notification was previously received from the collector service for the file.

Figure 4A:
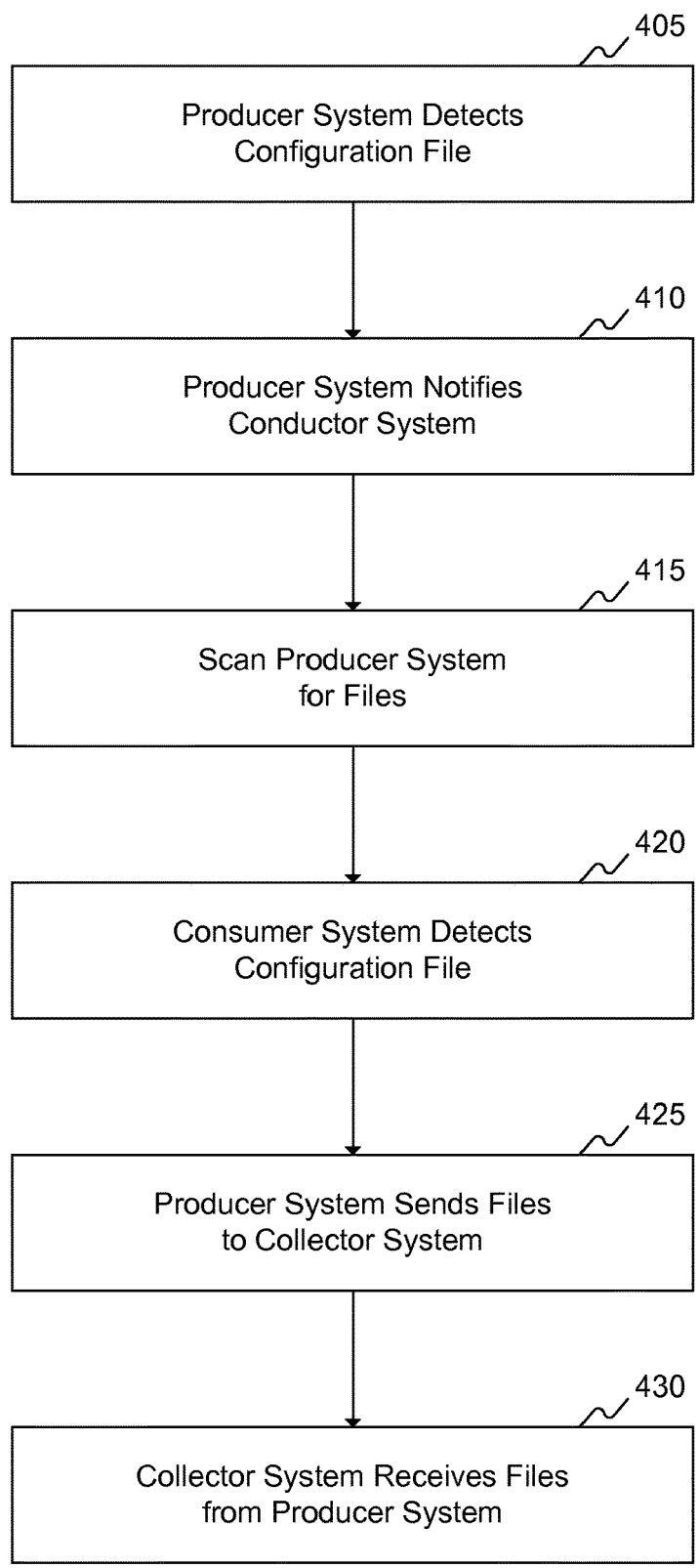
FIGS. 4A and 4B illustrate flow diagrams of exemplary processes for distributed file collection and processing, in accordance with embodiments of the present disclosure.
Figure 4B:
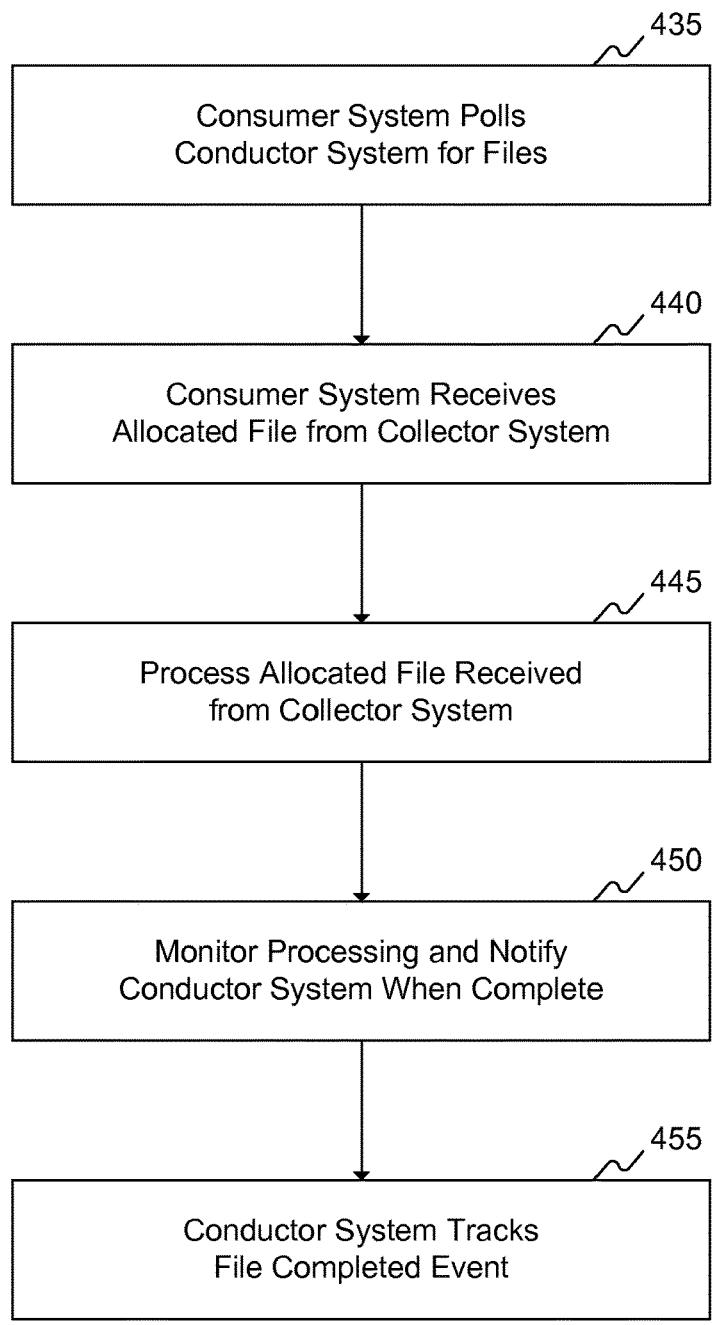

FIGS. 4A and 4B illustrate flow diagrams of exemplary processes 400A and 400B for distributed file collection and processing, in accordance with embodiments of the present disclosure. The steps associated with exemplary processes 400A and 400B may be performed by the components of the exemplary embodiment of FIG. 1 or 2. For example, the steps associated with the exemplary processes 400A and 400B may be performed by producer system 102, collector system 104, conductor system 106, and consumer system 108 of FIG. 1. The exemplary processes of FIGS. 4A and 4B may also be implemented with the components of FIG. 2. For purposes of illustration, exemplary processes 400A and 400B will be described below with reference to the exemplary components (205, 215, 225, 235, 245, 255, 265) and service elements (210, 220, 230, 240, 250, 260, 270) of FIG.

2. The number and arrangement of steps in processes 400A and 400B may be changed, modified, combined, and/or substituted, consistent with the present disclosure.

In step 405, a producer system (205, 215, or 225) detects a configuration file. For example, a producer service (210, 220, or 230) of producer system may detect a configuration file on its host producer system from application P producing event logs of type PF1. In step 410, the producer system notifies a conductor system (245). For example, a producer service notifies a conductor service (250) of configuration file, and the conductor service allocates a tracking budget for type PF1 event logs. Thereafter, the producer system is scanned for files in step 415. For example, the producer service begins to scan the host producer system for files of type PF1.

As further shown in FIG. 4A, a consumer system detects a configuration file in step 420. For example, a consumer service detects a configuration file on a consumer system from consumer application C1. The configuration file indicates that consumer application C1 consumes files of type PF1. In step 425, the producer system (205, 215, or 225) sends files to the collector system (235). For example, a producer service (210, 220, or 230) finds a file ("FILE1") of type PF1 and sends the file to a collector system (e.g., using UDT or FTP) and sends a notification to the conductor service that FILE1 was produced. In step, 430, the collector system (235) receives the files from the conductor system (245). For example, the collector system receives FILE1 in step 430 and notifies the conductor service, such that FILE1 is added to a tracking bucket associated with the conductor service.

As shown in FIG. 4B, in step 435, a consumer system (255 or 265) polls conductor system (245) for files. For example, a consumer service (260 or 270) polls conductor service (250) for files of type PF1 for consumer application C1, and the conductor service allocates FILE1 to the consumer service. Consumer system then receives the allocated file from the conductor system in step 440. For example, the consumer service pulls FILE1 from the collector system (e.g., using UDT or FTP) and stores the file on the consumer system for processing by consumer application C1 in step 440. The consumer system then processes the received file in step 445. For example, consumer application C1 processes FILE1 in step 445. In step 450, the consumer system monitors the processing of the file and notifies the conductor system when processing is complete. For example, the consumer service monitors the processing of FILE1 by consumer application C1 and notifies the conductor service when processing is complete. Finally, in step 455, the conductor system tracks the file completed event. For example, the conductor service tracks the file completed event.

FIG. 5 illustrates an example apparatus or system 500 for implementing embodiments and aspects of the present disclosure. By way of example, apparatus or system 500 may be used to implement each of the various system elements of FIGS. 1 and 2, including producer system 102, collector system 104, conductor system 106, and consumer system 108. The arrangement and number of components in system 500 is provided for purposes of illustration. Additional arrangements, number of components, and other modifications may be made, consistent with the present disclosure.

As shown in FIG. 5, exemplary system 500 may include one or more central processing units 501 (also referred to as an electronic processor or CPU) for executing instructions or code for managing and processing data, and performing other operations, consistent with the present disclosure. By way of example, CPU 501 may be implemented with general and/or special purpose microprocessors. System 500 also includes one more storage or memory devices 503. Storage device 503 may comprise optical, magnetic, signal, and/or any other type of storage device or computer readable media. By way of example, storage device 503 may include NOR or NAND flash memory devices, Read Only Memory (ROM) devices, Random Access Memory (RAM) devices, etc. Storage device 503 may also include storage mediums such as, for example, hard drives, solid state drives, tape drives, RAID arrays, etc. In some embodiments, storage device 503 stores instructions or code executed by CPU 501. Additionally, storage device 503 may store data that is processed by CPU 501.

As further shown in FIG. 5, system 500 may include one or more network adapters 505. Network adapter 505 may allow system 500 to connect to electronic networks, such as the Internet, a local area network, a wide area network, a cellular network, a wireless network, or any other type of network. Network adapter 505 may also allow system 500 to communicate with other systems or components, such as producer system 102, collector system 104, conductor system 106, and consumer system 108 (see FIG. 1). Network adapter 505 may be implemented with one or more communications interface(s), such as a modem, a wired or wireless communications interface (e.g., an Ethernet, Wi-Fi, Bluetooth, Near Field Communication, WiMAX, WAN, LAN, etc.), a communications port (e.g., USB, IEEE 1394, DisplayPort, DVI, HDMI, VGA, Serial port, etc.), a PCMCIA slot and card, etc. Network adapter 505 may transfer software and data in the form of signals, which may be electronic, electromagnetic, optical, or other signals capable of being received by network adapter 505. These signals may be provided to network adapter 505 via a communications path (not shown), which may be implemented using wireless, wire, cable, fiber optics, radio frequency ("RF") link, and/or other communications channels.

System 500 also includes one or more power units 506. Power unit 506 may enable system 500 and its components to receive power and operate fully. Power unit 506 may be implemented as a main power supply for system 500. Power unit 506 may also include secondary or auxiliary power supplies, as may be needed.

In some embodiments, system 500 may also include one or more input devices 502 and output devices 504. Input device 502 may be configured to receive input from users and/or devices. Input device 502 may include, but is not limited to, keyboards, mice, trackballs, trackpads, scanners, cameras, and other devices which connect via Universal Serial Bus (USB), serial, parallel, infrared, wireless, wired, or other connections. Output device 504 may transmit data to users and/or devices. Output device 504 may include, but is not limited to, computer monitors, televisions, screens, projectors, printers, plotters, and other recording/displaying devices which connect via wired or wireless connections.

In the preceding specification, various exemplary embodiments and features have been described with reference to the accompanying drawings. It will, however, be evident that various modifications and changes may be made thereto, and additional embodiments and features may be implemented, without departing from the broader scope of the invention as set forth in the claims that follow. The specification and drawings are accordingly to be regarded in an illustrative rather than restrictive sense.

For example, advantageous results still could be achieved if steps of the disclosed techniques were performed in a different order and/or if components in the disclosed systems were combined in a different manner and/or replaced or supplemented by other components. Moreover, while embodiments of the present disclosure have been described with reference to the processing of online advertising data, embodiments of the present disclosure may be applied to collect and/or process other types of data. Other implementations are also within the scope of the following exemplary claims.

Therefore, it is intended that the disclosed embodiments and examples be considered as exemplary only, with a true scope of the present disclosure being indicated by the following claims and their equivalents.

What is claimed is:

1. A system for updating distributed file collection systems for logging types of online user events without shutdown, the system comprising:
    a producer system that is associated with an online content server and comprises a first memory that stores a first set of instructions and a first processor in communication with the first memory and configured to execute the first set of instructions to:
        detect a producer configuration file that specifies a log file type, wherein the log file type is selected, based on a producer system type associated with the producer system, from a group consisting of an impression log type, a click log type, an action log type, and a bid log type, the impression log type corresponding to a log of consumer impressions of online content, the click log type corresponding to a log of consumer interaction with online content, the bid log type corresponding to a log of bids submitted for online content;
        identify at least one file of the specified log file type, wherein the at least one file identifies data associated with a user event, the user event being one of at least one of an impression event, a click event, an action event, or a bid event;
        send the at least one file to a collector system;
        automatically detect a file associated with a new file type on the producer system, the new file type not being a listed type in the producer configuration file;
        in response to detecting the new file type, automatically generate and transmit a message to a conductor system, the message to the conductor system comprising information regarding the new file type;
        receive instructions from the conductor system to automatically update the producer configuration file based on the new file type; and
        update the producer configuration file, based on the received instructions from the conductor system, to include the new file type without shutting down the producer system;
    the conductor system comprising a second memory that stores a second set of instructions and a second processor in communication with the second memory and configured to execute the second set of instructions to:
        receive a request from a consumer associated with a consumer system, the request identifying a requested file type;
        allocate the at least one file to the consumer system based on the requested file type;
        receive, at the conductor system from the producer system, a notification of the producer configuration file;
        in response to receiving the notification, track events associated with the producer configuration file;
        receive the message, at the conductor system from the producer system, comprising information regarding the new file type;
        determine, at the conductor system, whether to change the producer configuration file to include the new file type based the new file type not being a listed type in the producer configuration file; and
        upon determining to change the producer configuration file to include the new file type, transmit instructions to the producer system to update the producer configuration file to include the new file type;
    the collector system comprising a third memory that stores a third set of instructions and a third processor in communication with the third memory and configured to execute the third set of instructions to receive the at least one identified file from the producer system; and
    the consumer system comprising a fourth memory that stores a fourth set of instructions and a fourth processor in communication with the fourth memory and configured to execute the fourth set of instructions to:
        receive the request from the consumer associated with the consumer system;
        send the request to the conductor system;
        pull the at least one file from the collector system; and
        provide the at least one file to the consumer.

2. The system of claim 1, wherein the first processor is configured to execute the first set of instructions to receive a producer application configuration file from an application running on the first memory, and wherein detecting a producer configuration file comprises detecting the received producer application configuration file.

3. The system of claim 1, wherein the first processor is configured to execute the first set of instructions to identify at least one file of the specified log file type by scanning the first memory for files of the specified log file type.

4. The system of claim 1, wherein the first processor is configured to execute the first set of instructions to send the at least one file to the collector system using FTP.

5. The system of claim 1, wherein the first processor is configured to execute the first set of instructions to send the at least one file to the collector system using UDT.

6. The system of claim 1, wherein the request from the consumer system identifies a requested log file type.

7. The system of claim 6, wherein the second processor is configured to execute the second set of instructions to determine whether the producer system has any files of the requested log file type.

8. The system of claim 1, wherein:
    the third processor is configured to execute the third set of instructions to notify the conductor system that the at least one file has been received from the producer system; and
    the second processor is configured to execute the second set of instructions to track events associated with the at least one file.

9. The system of claim 1, wherein:
    the second processor is configured to execute the second set of instructions to send a configuration file to the producer system; and
    the first processor is configured to execute the first set of instructions to:
        receive the configuration file from the conductor system; and
        configure the producer system based on the received configuration file.

10. The system of claim 1, wherein:
the second processor is configured to execute the second set of instructions to send a configuration file to the collector system; and
the third processor is configured to execute the third set of instructions to:
  receive the configuration file from the conductor system; and
  configure the collector system based on the received configuration file.

11. The system of claim 1, wherein:
the first processor is configured to execute the first set of instructions to:
  send a request to the conductor system for a list of files that need to be resent to the collector system; and
  send files identified in the list of files to the collector system; and
the second processor is configured to execute the second set of instructions to:
  determine the list of files for the producer system to resend to the collector system; and
  send the list of files to the producer system.

12. The system of claim 1, wherein:
the first processor is configured to execute the first set of instructions to:
  send a request to the conductor system for a list of files to delete; and
  delete the files identified in the list of files; and
the second processor is configured to execute the second set of instructions to:
  determine the list of files for the producer system to delete; and
  send the list of files to the producer system.

13. The system of claim 1, wherein:
the third processor is configured to execute the third set of instructions to:
  send a request to the conductor system for a list of files to delete; and
  delete the files identified in the list of files; and
the second processor is configured to execute the second set of instructions to:
  determine the list of files for the collector system to delete; and
  send the list of files to the collector system.

14. A method for updating distributed file collection systems for logging types of online user events without shutdown, the method comprising the following operations performed by one or more processors:
detecting a configuration file that specifies a log file type, wherein the log file type is selected, based on a producer system type associated with a producer system, from a group consisting of an impression log type, a click log type, an action log type, and a bid log type, the impression log type corresponding to a log of consumer impressions of online content, the click log type corresponding to a log of consumer interaction with online content, the bid log type corresponding to a log of bids submitted for online content;
identifying at least one file of the specified log file type, wherein the at least one file identifies data associated with a user event, the user event being one of an impression event, a click event, an action event, or a bid event;
sending the at least one file to a collector system;
automatically detecting a file associated with a new file type, the new file type not being a listed type in the producer configuration file;
in response to detecting the new file type, automatically generating and transmitting a message to a conductor system, the message to the conductor system comprising information regarding the new file type;
receiving instructions from the conductor system to automatically update the configuration file based on the new file type;
updating the configuration file to include the new file type without shutting down;
receiving a request from a consumer associated with a consumer system, the request identifying a requested file type;
allocating, based on the requested file type, the at least one identified file to the consumer system;
providing a notification of the producer configuration file;
in response to receiving the notification, tracking events associated with the producer configuration file;
receiving the request from the consumer associated with the consumer system;
pulling the at least one identified file from the collector system to the consumer system; and
providing the at least one identified file to the consumer.

15. The method of claim 14, further comprising:
sending a request to the conductor system for a list of files to delete;
receiving, from the conductor system, the list of files; and
deleting the files identified in the list of files.

16. The method of claim 14, further comprising:
sending a request to the conductor system for a list of files that need to be resent to the collector system;
receiving, from the conductor system, the list of files; and
sending files identified in the list of files to the collector system.

17. A computer-readable medium that stores a set of instructions executable by at least one processor to configure the at least one processor to perform operations for updating distributed file collection systems for logging types of online user events without shutdown, the operations comprising:
detecting a configuration file that specifies a log file type, wherein the log file type is selected, based on a producer system type associated with a producer system, from a group consisting of an impression log type, a click log type, an action log type, and a bid log type, the impression loci type corresponding to a log of consumer impressions of online content, the click loci type corresponding to a log of consumer interaction with online content, the bid loci type corresponding to a log of bids submitted for online content;
identifying at least one file of the specified log file type, wherein the at least one file identifies data associated with a user event, the user event being one of an impression event, a click event, an action event, or a bid event;
sending the at least one file to a collector system;
automatically detecting a file associated with a new file type, the new file type not being a listed type in the producer configuration file;
in response to detecting the new file type, automatically generating and transmitting a message to a conductor system, the message to the conductor system comprising information regarding the new file type;
receiving instructions from the conductor system to automatically update the configuration file based on the new file type;
updating the configuration file to include the new file type without shutting down;

receiving a request from a consumer associated with a consumer system, the request identifying a requested file type;

allocating, based on the requested file type, the at least one identified file to the consumer system;

providing a notification of the producer configuration file;

in response to receiving the notification, tracking events associated with the producer configuration file;

receiving the request from the consumer associated with the consumer system;

pulling the at least one identified file from the collector system to the consumer system; and providing the at least one identified file to the consumer.

18. The computer-readable medium of claim 17, wherein the set of instructions further configure the at least one processor to perform operations comprising:

sending a request to the conductor system for a list of files to delete;

receiving, from the conductor system, the list of files; and deleting the files identified in the list of files.

19. The computer-readable medium of claim 17, wherein the set of instructions further configure the at least one processor to perform operations comprising:

sending a request to the conductor system for a list of files that need to be resent to the collector system;

receiving, from the conductor system, the list of files; and sending files identified in the list of files to the collector system.

* * * * *

UNITED STATES PATENT AND TRADEMARK OFFICE
CERTIFICATE OF CORRECTION

PATENT NO. : 10,606,804 B2
APPLICATION NO. : 14/607966
DATED : March 31, 2020
INVENTOR(S) : Martin Boyle Page 1 of 1

It is certified that error appears in the above-identified patent and that said Letters Patent is hereby corrected as shown below:

In the Claims

In Claim 17, delete "loci" and insert --log-- at Column 20, Line 45, Line 46, and Line 48.

Signed and Sealed this
Nineteenth Day of May, 2020

Andrei Iancu
*Director of the United States Patent and Trademark Office*